March 12, 1946. E. G. WARREN 2,396,355
APPARATUS FOR THE TRANSPORTATION OF DRY-BULK MATERIALS
Filed Feb. 8, 1944

INVENTOR.
EDWIN G. WARREN
BY Naylor and Lasagne
ATTORNEYS.

Patented Mar. 12, 1946

2,396,355

UNITED STATES PATENT OFFICE 2,396,355

APPARATUS FOR THE TRANSPORTATION OF DRY BULK MATERIALS

Edwin G. Warren, Hayward, Calif.

Application February 8, 1944, Serial No. 521,589

4 Claims. (Cl. 298—10)

This invention relates to apparatus for the transportation of dry, bulk materials. The apparatus has been designed particularly for handling materials such as cement, although it will be readily appreciated that it is useful for the handling of other dry, bulk materials.

The present invention has as one of its principal objects, the provision of bulk materials conveying means of simplified construction and utilizing a body made from a readily available fabricated shape. Another object of the invention is to provide a conveying means which will have certain decided advantages over the conventional structures in carrying capacity per pound of hauled weight. A further objective is the provision of means which will greatly facilitate the loading and unloading operations and in general to attain certain hitherto unheard of economies in operation.

These and other objects of the invention to be made apparent as this specification proceeds are attained by the device illustrated in the accompanying drawing, wherein.

Figure 1:
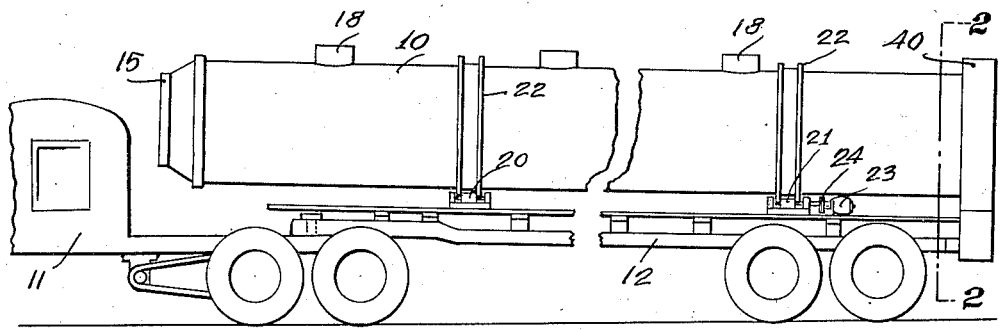
Figure 1 is a side elevation of the device.

The conventional dump truck body has almost uniformly followed the design of the earliest conveyances and utilized a top-opening box, despite the known disadvantages and limitations of such basic shape. Notable among the limitations has been the relatively low pay load capacity of such bodies; a limitation which cannot be overcome by mere increase in the size of the device because of universal weight restrictions and the fact that oversized devices are unwieldly and uneconomic to operate. Moreover, in the case of dump truck bodies, increasing the dimensions of the body beyond certain limits presents substantially insurmountable obstacles to the use of mechanical dump means.

The present invention contemplates a departure from the conventional box-shape and the use of elongated cylindrical bodies, the basic form of which is commonly fabricated as pipes, stacks and the like. It also contemplates the use of such cylindrical bodies with but a minimum expenditure in converting the same for the intended use.

The numeral 10 denotes a length of cylindrical pipe, in this instance, on the order of 4 feet in diameter, supported on a truck 11 and a trailer 12. While shown as a semi-trailer unit it will be appreciated, of course, that the cylindrical body 10 may be wholly supported on a trailer unit, thus leaving the truck free for other uses as a power unit, or it may be utilized in other combinations of vehicles, or even on railway cars and/or barges.

The cylindrical body 10, in the preferred form of the invention, has a forward end permanently closed by means such as the cap 15, and an adjustable closure means 16 at its discharge end. (See Figure 2). The body 10 is filled through the several manholes 18 disposed therein in longitudinal alignment, and it will be noted that the mounting of body 10 with respect to truck 11 and trailer 12 is such that clearance is provided for the manholes when body 10 is rotated.

The body 10 is, as shown in Figure 1, rotatably supported on the truck 11 and trailer 12, by means of a cradle of roller bearings, two of which are indicated at 20 and 21. The body 10 is held against longitudinal movement by the twin annular flanges 22 each pair of which engages one of the roller bearings in the manner of a bearing collar.

The body 10 may be rotated by any conventional power hook-up, such as that shown in the form of an electric motor 23, as the prime mover, with a chain and sprocket transmission 24 connected to the roller bearing 21, to provide a friction drive.

It has been found that the discharge of the load may be speeded up when body 10 is inclined with respect to the ground level. An alternative to building up or seeking an inclined ground surface for the unloading operation is to construct the vehicle with the body 10 inclined downwardly toward the rear at approximately 11° with respect to the truck and trailer beds as shown in Figure 1.

The discharge means has been designed not only to facilitate the unloading operation but also to effectively control the dust usually incident to the handling of dry material.

Figure 2:
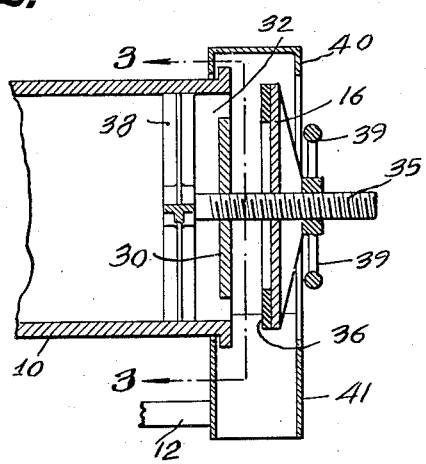
Figure 2 is a vertical section of the discharge means, taken along line 2—2 of Figure 1.
Figure 3:
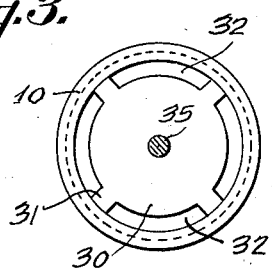
Figure 3 is a vertical section taken along the line 3—3 of Figure 2 showing the end of the body member.

As shown to best advantage in Figure 3, an end plate 30, of smaller diameter than the cylindrical body 10, is fixed in the discharge end thereof by means of the radially extending connecter bars 31, thus providing annular discharge ports 32. As illustrated in Figure 2, an end gate 16 is supported on a screw 35 and on its inner face there is provided a gasket member 36 to seal the discharge ports 32 when gate 16 is moved into its closed position. The inner end of screw 35 is fixed in a spider 38, disposed within the body 10, and its outer end projects through end plate 30 for threaded engagement with a handwheel 39 which facilitates the opening and closing of the end gate 16.

A suitable cover means for the discharge end of body 10 is provided in a yoke-like hood 40, supported on the chassis of trailer 12, the lower end of which tapers into a discharge chute 41. As will be noted from Figure 2, hood 40 is not connected in any way to body 10 and the end of the latter is therefore free to rotate therein. Hood 40 has a central opening to provide access to handwheel 39 and also to permit air to enter body 10 to displace discharged material.

It has been observed that the adjustability of the discharge means is a desirable factor in the unloading operation, and this will be best understood in a description of the operation of the device, which now follows. The body 10 is moved under any conventional charging means such as an overhead hopper or storage bins. The body is then rotated on its support to bring the manholes 18 to their intake position or top side of the body 10. End gate 16 is then moved by the handwheel 39 to its fully closed position. The truck body is then charged with the material to be conveyed and the covers of manholes 18 are replaced.

In the handling of certain materials it has been found necessary to settle the initial charge in order to make up a full load and this can be accomplished by the simple expedient of closing the manholes and driving the vehicle a short distance over normal highway surfaces and then returning the vehicle to receive a further and final charge of the materials.

It will be understood that during transit the body 10 is not rotated but rather remains fixed on its bed just as any conventional hauling means for materials of the sort described above.

When the carrier has reached destination the end gate 16 is opened by means of the handwheel 39 to adjust the discharge opening to the desired rate of flow and motor 23 is then started to effect rotation of the cylindrical body 10 through the frictional engagement of bearing roller 21 and the body 10. The manholes 18 obviously remain closed during the unloading operation. As the body 10 is rotated the material flows in a steady stream through the discharge chute 41 and the rate of flow can be regulated by opening or closing end gate 16 in the indicated manner. It has been observed that the structure shown and described herein effectively controls dust. According to observation air entering the opening in hood 40 passes into the body 10 through the discharge ports 32 and carries with it such dust as is raised in the agitation of the material caused by rotation of body 10.

In the handling of dry, bulk materials, such as cement, effective control of dust is important for a number of reasons. It is uneconomic to lose appreciable quantities of the material through substantial agitation in the loading and unloading operations and, further, constant exposure of carrier equipment to such dust causes excessive and accelerated wear and tear on the parts. The apparatus forming the subject matter hereof is particularly useful in this regard in employing a smooth bore cylindrical body to minimize the agitation of the material and in utilizing a discharge means capable of producing a counterflow current of air into the body during discharge to dampen the tendency of the material to dissipate itself in part in the form of dust. Additionally, by shielding the discharge means the creation and dispersion of dust is reduced to a negligible degree.

From the foregoing it is believed obvious that I have devised a new and useful carrier means for dry, bulk materials. As the principles of the invention may take forms other than that shown and described herein by way of illustration, protection is desired according to the full scope of the appended claims.

The invention claimed is:

1. An apparatus for the transportation of dry, bulk materials comprising, an elongated cylindrical body, a wheeled support therefor, a bearing cradle for said body on said wheeled support, means cooperating with said bearing cradle to prevent longitudinal movement of said body with respect to its support, said body having a permanently closed end and adjustable closure means for its discharge end, a plurality of filling openings arranged at spaced intervals throughout the length of said body, and a hood encasing the discharge end of said body but leaving the latter free to rotate therein, said hood tapering into a discharge chute to receive material discharged from said body.

2. An apparatus for the transportation of dry, bulk materials comprising, an elongated cylindrical body, wheeled vehicular support therefor, a mounting on the wheeled vehicular support to permit relative rotation of the body but preventing relative longitudinal movement thereof, said body having a permanently closed end and adjustable closure means for its discharge end, a plurality of filling openings arranged at spaced intervals throughout the length of said body, means for rotating said body upon its mounting, said body being permanently inclined with respect to its mounting, the order of inclination being such that the contents of the body are caused to be completely discharged upon rotation of said body but insufficient to cause discharge when said body is at rest.

3. An apparatus for the transportation of dry, bulk materials comprising, an elongated cylindrical body, wheeled vehicular support therefor, a mounting on the wheeled vehicular support to permit relative rotation of the body but preventing relative longitudinal movement thereof, said body having a permanently closed end and adjustable closure means for its discharge end, a plurality of filling openings arranged at spaced intervals throughout the length of said body, said body being permanently inclined with respect to its mounting, means for rotating said body to effect discharge of its contents, and means cooperating with the adjustable closure means for the discharge end of said body whereby a counterflow of air is directed into said body above the discharging material.

4. An apparatus for the transportation of dry, bulk materials comprising, an inclined elongated cylindrical body, wheeled vehicular support therefor, a mounting on the wheeled vehicular support to permit relative rotation of the body but preventing relative longitudinal movement thereof, said body having a permanently closed end and adjustable closure means for its discharge end, means for rotating said body to effect discharge of its contents, a hood member encasing the discharge end of the body but leaving the latter free to rotate therein, said hood carrying a discharge chute to receive material discharged from said body, and an air intake opening in the hood independent of the discharge chute whereby an airstream may be directed into the body above the discharging material.

EDWIN G. WARREN.